United States Patent
Venkataswamy et al.

(10) Patent No.: US 12,208,916 B2
(45) Date of Patent: Jan. 28, 2025

(54) METHODS AND SYSTEMS FOR PROVIDING CONTEXTUAL DISPLAY MODES FOR A VERTICAL TAKEOFF AND LANDING VEHICLE

(71) Applicant: Honeywell International Inc., Charlotte, NC (US)

(72) Inventors: Sadguni Venkataswamy, Bangalore (IN); Suresh Bazawada, Bangalore (IN); Anil Kumar Songa, Bangalore (IN); Mohammed Ibrahim Mohideen, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 183 days.

(21) Appl. No.: 18/069,375

(22) Filed: Dec. 21, 2022

(65) Prior Publication Data
US 2024/0124153 A1    Apr. 18, 2024

(30) Foreign Application Priority Data
Oct. 13, 2022  (IN) .............................. 202211058532

(51) Int. Cl.
    *B64D 45/00*    (2006.01)
    *G01C 23/00*    (2006.01)
    *B64C 29/00*    (2006.01)

(52) U.S. Cl.
    CPC ............. *B64D 45/00* (2013.01); *G01C 23/00* (2013.01); *B64C 29/0008* (2013.01)

(58) Field of Classification Search
    None
    See application file for complete search history.

(56) References Cited

U.S. PATENT DOCUMENTS 6,832,138 B1    12/2004  Straub et al.
8,099,202 B1 *  1/2012   Krenz .................. G01C 23/005
                                                        701/16
(Continued)

FOREIGN PATENT DOCUMENTS

CN    105588579 A     5/2016
CN    112173141 A  *  1/2021  ............. B64D 43/00
(Continued)

OTHER PUBLICATIONS

Peter Stutz, A Synthetic vision application in integrated modular avionics architecture, 2001 IEEE, pp. 1-12 (Year: 2001).*
(Continued)

*Primary Examiner* — Justin S Lee
(74) *Attorney, Agent, or Firm* — Alston & Bird LLP

(57) ABSTRACT

A method of providing contextual display modes for a vertical takeoff and landing (VTOL) vehicle including obtaining aircraft flight information including a current position and altitude; retrieving vertiport information for a vertiport at the current position of the aircraft; displaying, to one or more operators of the aircraft, a takeoff synthetic vision display mode; transitioning, as the current altitude approaches the transitional altitude, from the takeoff synthetic vision display mode to a cruise synthetic vision display mode, wherein the cruise synthetic vision display mode represents the view from a cruise display viewpoint at the current altitude of the aircraft and at the current position of the aircraft; and displaying, in response to the current altitude equaling or exceeding the transitional altitude, the cruise synthetic vision display mode.

20 Claims, 9 Drawing Sheets

(56) References Cited

U.S. PATENT DOCUMENTS

| | | | |
|---|---|---|---|
| 8,159,416 B1* | 4/2012 | Yum | G01C 23/00 340/980 |
| 8,193,948 B1* | 6/2012 | Shapiro | G01C 23/005 701/16 |
| 8,698,654 B2* | 4/2014 | He | G08G 5/065 701/16 |
| 9,105,115 B2* | 8/2015 | Feyereisen | G06T 11/00 |
| 9,284,058 B2 | 3/2016 | Wang | |
| 9,390,559 B2* | 7/2016 | Feyereisen | B64D 45/00 |
| 9,517,844 B2* | 12/2016 | Khatwa | G08G 5/065 |
| 10,229,606 B2 | 3/2019 | Moran et al. | |
| 10,789,854 B1 | 9/2020 | Kolesinski | |
| 11,097,851 B1* | 8/2021 | Myers | G06F 3/04883 |
| 11,315,434 B2 | 4/2022 | Kolesinski et al. | |
| 2009/0132100 A1* | 5/2009 | Shibata | G05D 1/0038 340/963 |
| 2009/0281684 A1* | 11/2009 | Spek | G01C 23/005 701/7 |
| 2012/0026190 A1* | 2/2012 | He | G06T 11/001 345/633 |
| 2012/0194556 A1 | 8/2012 | Schmitt et al. | |
| 2014/0368359 A1* | 12/2014 | Johnson | G01C 23/00 340/969 |
| 2016/0332745 A1* | 11/2016 | Kneuper | B60K 35/29 |
| 2017/0158353 A1 | 6/2017 | Schmick | |
| 2018/0238708 A1* | 8/2018 | He | B64D 45/08 |
| 2023/0015158 A1* | 1/2023 | Evans | B64C 37/02 |
| 2023/0042820 A1* | 2/2023 | Gurusamy | G08G 5/0013 |
| 2023/0384801 A1* | 11/2023 | Henck | B64D 27/30 |

FOREIGN PATENT DOCUMENTS

| | | | |
|---|---|---|---|
| EP | 2234088 A2 * | 9/2010 | G01C 23/005 |
| EP | 3236213 A2 * | 10/2017 | B64D 43/00 |
| WO | WO-2011039666 A1 * | 4/2011 | G08G 5/0021 |
| WO | 2019056172 A1 | 3/2019 | |
| WO | 2021070517 A1 | 4/2021 | |

OTHER PUBLICATIONS

Extended European Search Report Mailed on Mar. 4, 2024 for EP Application No. 23198862, 7 page(s).

* cited by examiner

METHODS AND SYSTEMS FOR PROVIDING CONTEXTUAL DISPLAY MODES FOR A VERTICAL TAKEOFF AND LANDING VEHICLE

CROSS-REFERENCE TO RELATED APPLICATIONS

This application claims the benefit of priority under 35 U.S.C. § 119 from Indian Patent Application No. 202211058532, filed on Oct. 13, 2022, the contents of which are incorporated by reference in their entirety.

TECHNICAL FIELD

Various embodiments of the present disclosure relate generally to the field of navigation for urban air mobility vehicles and, more particularly, to methods and systems for providing contextual display modes for a vertical takeoff and landing vehicle (VTOL).

BACKGROUND

Urban air mobility (UAM) vehicles are often used to navigate in regions with features such as tall buildings and structures, including some buildings on which the UAM vehicle may land. In order to navigate these airspaces, it is often beneficial to have a vehicle capable of vertical takeoffs and landings. Helicopters are one example of such vehicles, however another class of vehicles known as vertical takeoff and landing (VTOL) also are configured to be able to take off and land vertically. As these vehicles are deployed in urban airspaces, conventional guidance computation and display for lateral and vertical deviations may be insufficient for these vehicles to perform both fixed-wing cruising and vertical takeoffs and landings.

The present disclosure is directed to overcoming one or more of these above-referenced challenges.

SUMMARY OF THE DISCLOSURE

According to certain aspects of the disclosure, systems and methods are disclosed for providing contextual display modes for a vertical takeoff and landing vehicle (VTOL).

For instance, in one embodiment a method of providing contextual display modes for a vertical takeoff and landing (VTOL) vehicle includes obtaining aircraft flight information including a current position and a current altitude of an aircraft; retrieving, from a database, vertiport information for a vertiport at the current position of the aircraft, including a transitional altitude; displaying, to one or more operators of the aircraft, a takeoff synthetic vision display mode, wherein the takeoff synthetic vision display mode represents a view from a takeoff display viewpoint at the current altitude of the aircraft and behind the current position of the aircraft; transitioning, as the current altitude approaches the transitional altitude, from the takeoff synthetic vision display mode to a cruise synthetic vision display mode, wherein the cruise synthetic vision display mode represents the view from a cruise display viewpoint at the current altitude of the aircraft and at the current position of the aircraft; and displaying, in response to the current altitude equaling or exceeding the transitional altitude, the cruise synthetic vision display mode.

In another embodiment a system includes at least one display associated with an aircraft; a memory storing instructions; and a processor executing the instructions to perform a process for providing contextual display modes for a vertical takeoff and landing vehicle (VTOL) including: obtaining aircraft flight information including a current position and a current altitude of the aircraft; retrieving, from a database, vertiport information for a vertiport at the current position of the aircraft, including a transitional altitude; displaying, to one or more operators of the aircraft on the at least one display, a takeoff synthetic vision display mode, wherein the takeoff synthetic vision display mode represents a view from a takeoff display viewpoint at the current altitude of the aircraft and behind the current position of the aircraft; transitioning, as the current altitude approaches the transitional altitude, from the takeoff synthetic vision display mode to a cruise synthetic vision display mode, wherein the cruise synthetic vision display mode represents the view from a cruise display viewpoint at the current altitude of the aircraft and at the current position of the aircraft; and displaying, in response to the current altitude equaling or exceeding the transitional altitude, the cruise synthetic vision display mode.

In yet another embodiment A method of providing contextual display modes for a vertical takeoff and landing (VTOL) aircraft includes obtaining aircraft flight information including a current position and a current altitude of the aircraft; retrieving, from a database, vertiport information for a vertiport at the current position of the aircraft, including a transitional altitude; displaying, to one or more operators of the aircraft, a takeoff synthetic vision display mode, wherein the takeoff synthetic vision display mode represents a view from a takeoff display viewpoint at the current altitude of the aircraft and behind the current position of the aircraft; transitioning, as the current altitude approaches the transitional altitude, from the takeoff synthetic vision display mode to a cruise synthetic vision display mode, wherein the cruise synthetic vision display mode represents the view from a cruise display viewpoint at the current altitude of the aircraft and at the current position of the aircraft; displaying, in response to the current altitude equaling or exceeding the transitional altitude, the cruise synthetic vision display mode; transitioning, as the aircraft approaches a landing vertiport, from the cruise synthetic display mode to a landing synthetic display mode, wherein the landing synthetic vision display mode represents the view from a landing display viewpoint at the current altitude of the aircraft and behind the current position of the aircraft; displaying, in response to the aircraft being in vertical alignment with the landing vertiport, the landing synthetic display mode; and wherein transitioning between the takeoff synthetic vision display mode and the cruise synthetic vision display mode occurs at a rate that is correlated with at least one of a current speed of the aircraft or the current altitude of the aircraft.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of navigation for Urban Air Mobility (UAM) vehicles and, more particularly, to systems and methods for providing contextual display modes for a vertical takeoff and landing vehicle (VTOL).

The present disclosure is directed to overcoming one or more of the challenges discussed above. UAM vehicles operating in urban airspaces may benefit from an ability to take off and land vertically, in addition to the ability to cruise during fixed-wing flight. Accordingly, aircraft may be fitted with a number of displays and navigation aids to provide the operators with information, for example, the positions and heights of buildings in the airspace. When operating the aircraft, the operators may benefit from a system that has the ability to determine and display vehicle paths, including determining a switchover point between vertical propulsion and fixed-wing cruising.

In general, the present disclosure is directed to systems and methods that are able to address one or more of the above challenges by using aircraft and vertiport information to determine an appropriate path and dynamic switchover point to control one or more propulsion systems of an aircraft. For instance, a system may determine a switchover point that transitions an aircraft between vertical and cruising phases of flight in a manner that avoids obstacles while maintaining efficiency. The systems and/or methods of the present disclosure for facilitating takeoff and landing of an aircraft may have an advantage of automatically determining a dynamic switchover point between vertical and cruise phases of flight based on a number of dynamic factors, thereby allowing the aircraft to be efficiently routed with reduced operator intervention.

Therefore, by determining the dynamic switchover point, operators may be able to provide additional attention to other aspects of aircraft flight, while still navigating an efficient path based on dynamically changing conditions.

While this disclosure describes the systems and methods with reference to aircraft, it should be appreciated that the present systems and methods may be applicable to various other vehicles, including those of drones, spacecraft, or any other manned, unmanned, autonomous, and/or internet-connected vehicles, including vehicles operated with one or more propulsion systems and/or phases of flight.

Figure 1:
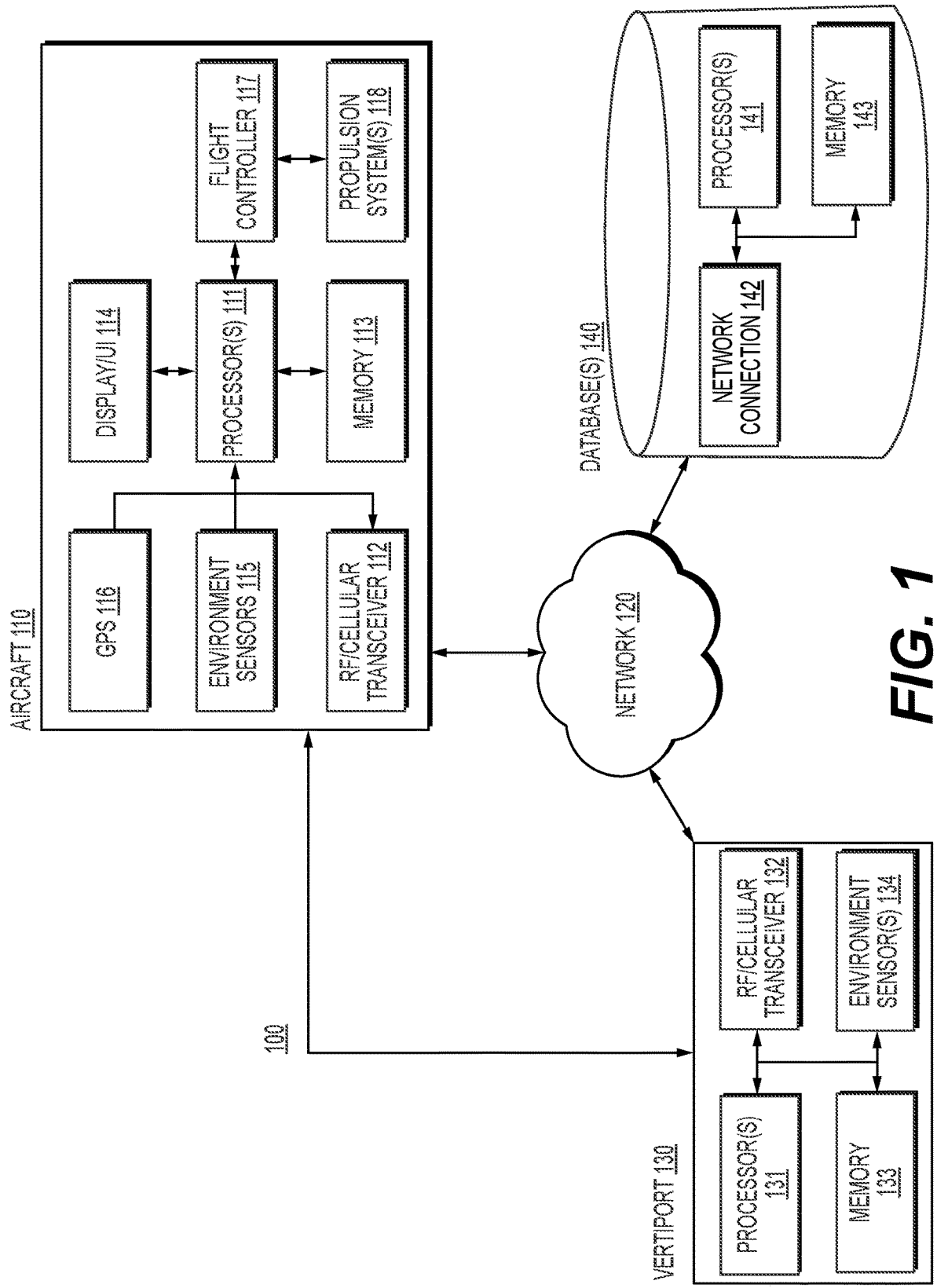
FIG. 1 depicts an exemplary system environment, operation of which may be used to implement methods, systems, and other aspects of the present disclosure.

FIG. 1 depicts an example of a system environment 100 in which systems, methods, and other aspects of the present disclosure may be implemented. The system environment 100 of FIG. 1 may include an aircraft 110, a network 120, vertiport 130, and database(s) 140. Aircraft 110 may include processor(s) 111 in communication with a plurality of other components such as RF/cellular transceiver 112, memory 113, display/user interface (UI) 114, environment sensors 115, GPS 116, flight controller 117, and one or more propulsion systems 118. Processor 111 may include one or more processors that comprise the computing and flight management systems of aircraft 110.

Memory 113 may be one or more components configured to store data related to aircraft 110, including instructions for operating flight components and aircraft systems (e.g., autopilot, route planning, communication). Processor 111 and memory 113 may display information to, and receive inputs from an operator of aircraft 110 via display/UI 114. Display/UI 114 may be of any suitable type, such as one or more monitors, touchscreen panels, heads-up displays, and may include operator input devices such as joysticks, buttons, touch-responsive panels, mice, trackpads, voice recognition devices, and the like. As the aircraft operates, processor 111 may generate one or more graphical user interfaces (GUIs) for display on display/UI 114, to provide relevant and useful information to operators and/or passengers of aircraft 110.

In some embodiments, processor 111 may communicate with environment sensors 115 to, for example, sense obstacles and conditions in and around aircraft 110 as it traverses the airspace, and communicate with GPS 116 in order to, for example, locate aircraft 110 in the airspace. Processor 111 may also be in communication with a flight controller 117 in order to, for example, provide control information to one or more propulsion systems 118. Without deviating from the scope of this disclosure, aircraft 110 may have additional elements that can be in communication with processor 111.

Aircraft 110 may use RF/cellular transceiver 112 to communicate with other elements of the system environment, for example, via network 120 or directly by radio communication. Network 120 may be implemented as, for example, the internet, a wireless network, Bluetooth, Near Field Communication (NFC), or any other type of network or combination of networks that provides communications between one or more components of the system environment 100. In some embodiments, the network 120 may be implemented using a suitable communication protocol or combination of protocols such as a wired or wireless internet connection in combination with a cellular data network.

Aircraft 110 may take off from, or land at, a vertiport 130. Vertiport 130 may be configured to provide aircraft 110 with information, such as information regarding air traffic, weather conditions, obstacles, and/or other information useful for the flight of aircraft 110. Vertiport 130 may include a processor 131, an RF/cellular transceiver 132, a memory 133, and one or more environment sensors 134.

Environment sensors 134 may include, for example, sensors to determine weather conditions, traffic conditions, and/or other information that may be relevant to aircraft as they take-off from, or land at, vertiport 130. Processor 131 and memory 133 may collect and transmit information via RF/cellular transceiver 132, for example, information collected by environment sensors 134. Vertiport 130 may also be in communication with, for example, air traffic control, meteorologists, and/or one or more databases 140.

One or more databases 140 may be repositories for system information such as map data, building data, flight plan data, and the like. Database 140 may include a processor 141, a network connection 142, and a memory 143. Memory 143 may store data, processor 141 may access and organize the stored data to respond to requests and provide updates to the stored data, and information may be provided to other elements in system environment 100 via network connection 142. In some embodiments, database 140 may communicate directly with aircraft 110 via network 120. Further, vertiport 130 may be configured to relay requests for information from aircraft 110 to database 140 via its RF/cellular transceiver 132 or other network connection.

Although depicted as separate components in FIG. 1, it should be understood that a component or portion of a component in the system environment 100 may, in some embodiments, be integrated with or incorporated into one or more other components. In some embodiments, operations or aspects of one or more of the components discussed above may be distributed amongst one or more other components. Any suitable arrangement and/or integration of the various systems and devices of the system environment 100 may be used.

In the following methods, various acts may be described as performed or executed by a component from FIG. 1. However, it should be understood that in various embodiments, various components of the system environment 100 discussed herein may execute instructions or perform acts including the acts discussed herein. An act performed by a device may be considered to be performed by a processor, actuator, or the like associated with that device. Further, it should be understood that in various embodiments, various steps may be added, omitted, and/or rearranged in any suitable manner.

Figure 2:
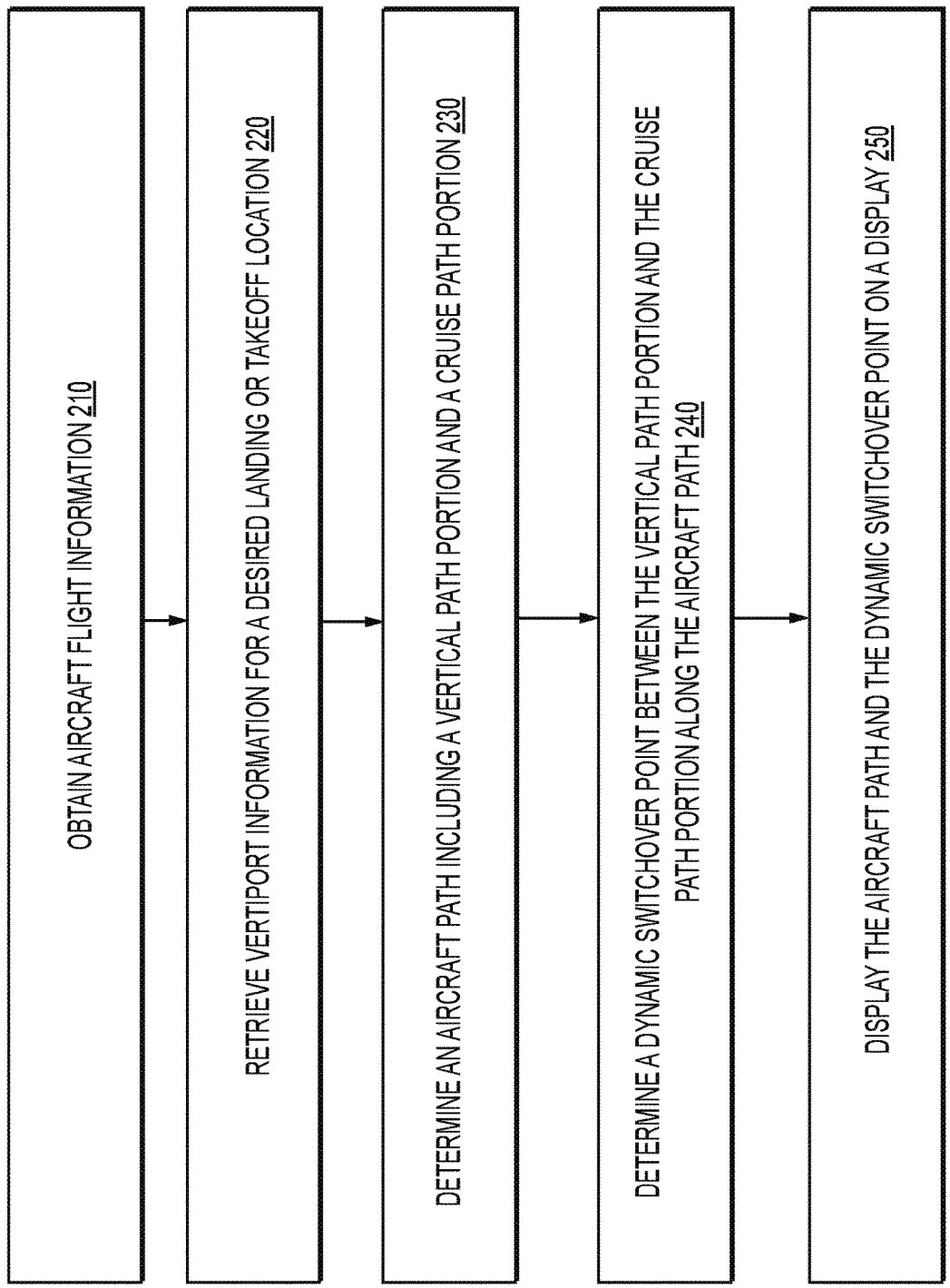
FIG. 2 depicts a flowchart for an exemplary process for facilitating takeoff and landing of an aircraft.

FIG. 2 illustrates an exemplary method 200 for facilitating takeoff and landing of an aircraft in accordance with embodiments of the present disclosure. It should be understood that the steps described herein, and the sequence in which they are presented, are merely illustrative such that additional and/or fewer steps may be included without departing from the scope of the present disclosure.

Beginning at step 210, aircraft flight information may be obtained (e.g., by the processor 111), for example from environment sensors 115 and/or GPS 116. Aircraft flight information may include one or more of a current position, a current altitude, a current trajectory, local terrain elevation, a target destination, and the like. The aircraft flight information may also establish parameters for the aircraft flight path, and/or may aid in the determination of conditions of, and/or obstacles in, the airspace.

Having obtained the aircraft flight information, at step 220, the system may then retrieve vertiport information for a desired landing or takeoff location area. This retrieved vertiport information can include, for example, map data, current environmental information, current traffic information, and/or other information that may be relevant to aircraft 110 that is or will be in the vicinity of vertiport 130. The vertiport information may be retrieved from vertiport 130 directly, and/or from one or more databases 140, for example, a vertiport database maintained by an organization such as the FAA. Vertiport information may also be received from other aircraft in the airspace, concurrently, and/or at a previous time. In some embodiments, the vertiport information may be routinely updated and/or requested from external entities on a routine basis (e.g., hourly, daily, weekly, at each flight, etc.)

At step 230, an aircraft path including a vertical path portion and a cruise path portion may be determined (e.g., using processor 111). The current position of aircraft 110 and the desired destination can establish the beginning and ending points of the aircraft path. From a top down perspective, the aircraft path may be determinable based on these points, information regarding obstacles, and the like. This aircraft path can generally orient the aircraft in the airspace with respect to the current aircraft position and destination.

Having determined the aircraft path, at step 240, a dynamic switchover point between the vertical path portion and the cruise path portion along the aircraft path may be determined (e.g., using the processor 111). In some embodiments, as in a takeoff path, determining the dynamic switchover point between the vertical path portion and the cruise path portion along the aircraft path can include determining a climb-path angle. In some embodiments, such as a landing path, determining the dynamic switchover point between the vertical path portion and the cruise path portion along the aircraft path can include determining a glide-path angle.

These climb-path and glide-path angles may be determined based on a number of factors including: the type, weight, power, fuel level, or other characteristics of the aircraft; the positions, heights, and other characteristics of buildings and structures near vertiport 130, one or more guidelines regarding suitable travel angles and clearances required by FAA or other regulations, and other such factors. In takeoff situations where the climb-path angle is determined to be small, the vertical path portion of the aircraft may be extended to provide sufficient clearance of other buildings, while situations that allow a steeper climb-path angle may not require as much vertical travel. Similarly, in landing situations where the glide-path angle is determined to be small, the vertical path portion of the aircraft may be extended to provide sufficient clearance of other buildings, while situations that allow a steeper glide-path angle upon approach to vertiport 130 may not require as much vertical travel.

In addition to the appropriate climb-path/glide-path angles, the proximity of the switchover point to vertiport 130 may be a function of many factors. For example, if the particular aircraft is able to more quickly transition from forward thrust to vertical thrust, the switchover point may be located closer to vertiport 130. Additionally, or alternatively, a faster and/or heavier aircraft may need to begin transitioning further away from vertiport 130, indicating a switchover point that may be further from vertiport 130.

Once the aircraft path and dynamic switchover point have been determined, processor 111 may transmit control information to one or more aircraft propulsion systems 118. The control information may include, for example, a vertical control portion and a cruise control portion, and processor 111 may cause the control information to be transmitted directly or indirectly to one or more aircraft propulsion systems 118 or via flight controller 117. For example, one or more aircraft propulsion systems 118 can operate under the vertical control portion or the cruise control portion of the control information until the aircraft reaches the dynamic switchover point, at which point aircraft propulsion systems 118 can operate under the other of the vertical control portion or the cruise control portion of the control information. In some embodiments, the control information can include additional components, such as a transition control portion. Such a transition control portion, may allow two or more aircraft propulsion systems 118 to remain in operation while the aircraft operates under the transition control portion.

In order to inform the operators and/or passengers of the dynamic switchover and flight path, at step 250, the aircraft path and/or the dynamic switchover point may be displayed on display/UI 114 (e.g., by the processor 111). Depending on the current position, current altitude, or phase of flight of the aircraft, an appropriate display mode may be selected. For example, and as discussed below with respect to FIGS. 3 and 5, a first-person display mode (or "ego" display mode) may be employed during a cruise path portion, while a third-person display mode (or "external" or "exo" display mode) may be employed during a vertical path portion.

In order to be responsive to changing conditions such as traffic and weather conditions, aircraft 110 may obtain updated aircraft and vertiport information and update the dynamic switchover point accordingly. The updated aircraft information may include, for example, updates to the current position and the current altitude of the aircraft, and updated vertiport information can include updates to the current environmental information and current traffic information. Further, in some embodiments, portions of the calculated path, such as the vertical path portion, may be transmitted to vertiport 130 and/or database 140 to provide updates to the current traffic information available to other aircraft.

Figure 3:
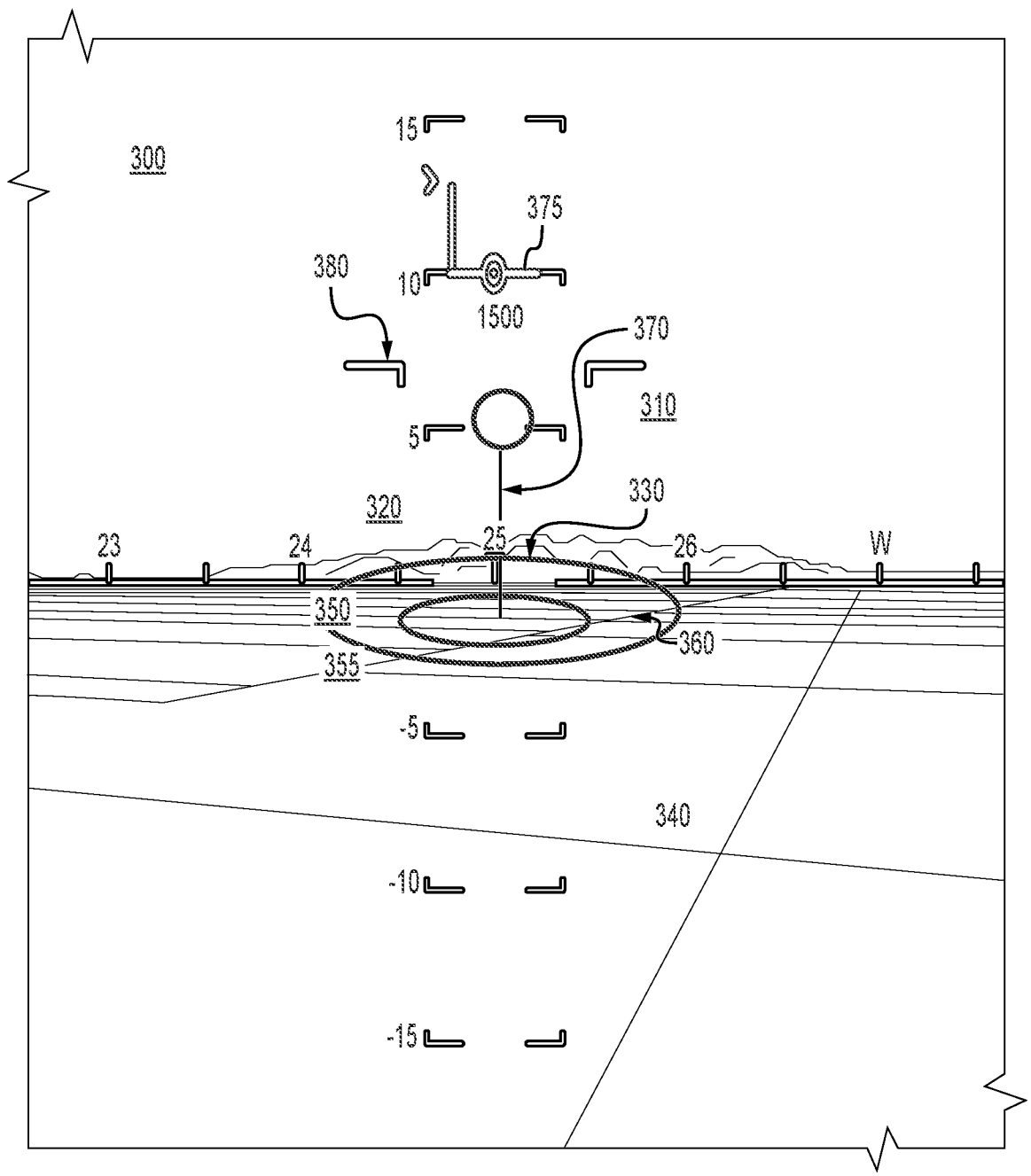
FIG. 3 depicts an exemplary virtual representation of an airspace in which methods, systems, and other aspects of the present disclosure may be implemented.

FIG. 3 depicts an exemplary aircraft landing path in an exemplary virtual airspace 300. The exemplary virtual airspace 300 may be a virtual rendering of objects and aircraft in an actual airspace (e.g., the airspace surrounding a flight path, near an airport and/or vertiport, etc.) FIG. 3 depicts the virtual airspace 300 from a first-person (or "ego" view), that is, generally showing a depiction of the airspace surrounding the aircraft as it would appear from a nose or just outside a windshield of the aircraft, without rendering the aircraft in the depiction. As aircraft 310 navigates above buildings and structures 320 in airspace 300, aircraft 310 may proceed along a cruise path 340 (e.g., follow a heading) approaching the destination vertiport 330. During this portion of the path, aircraft 310 may be operating under the power of a propulsion system 118 configured to provide thrust in multiple dimensions (e.g., horizontally, vertically) with the propulsion system 118 providing thrust in the forward direction. In order to land at vertiport 330, aircraft 310 may transition, at a switchover point 350, to a transition segment 360 of the flight path. The switchover point 350 may be virtually represented by one or more target rings 355 and the transition segment 360 may begin once the aircraft 310 has entered into an airspace represented by a transition ring 365. The transition ring 365 may virtually represent (e.g., on the display/UI 114) a geographical area surrounding a target, for example, the vertiport 130 such that when the aircraft 310 is within a horizontal distance of the vertiport 130, it may begin to transition to the vertical flight path. During this transition segment 360 of the flight path, one or more propulsion systems 118 of aircraft 310 may transition from the forward thrust provided during the cruise path 340 to a vertical thrust in order to vertically land at vertiport 330 and during operation in the transition segment 360, the aircraft 310 may operate to provide thrust in both the horizontal and vertical directions (e.g., upward and forward/backward). This transition allows aircraft 310 to move from a horizontal segment of the flight path, which is generally depicted in FIG. 3, to the transition segment 360 of the flight path to the vertical path 370. In some embodiments, one or more of a vertical target 375 and a recommended altitude graphic 380 may be displayed. The vertical target 375 may graphically represent an area surrounding a recommended altitude above the vertiport 330 at which the aircraft should begin its descent to land at the vertiport 330. That is, the vertical target 375 may provide a virtual representation to an operator of the aircraft of the best altitude at which to begin landing the aircraft once it has entered the switchover point 350 and transitioned from the horizontal (i.e., thrust fore and aft) to vertical flight mode (i.e., thrust up and down).

Figure 4:
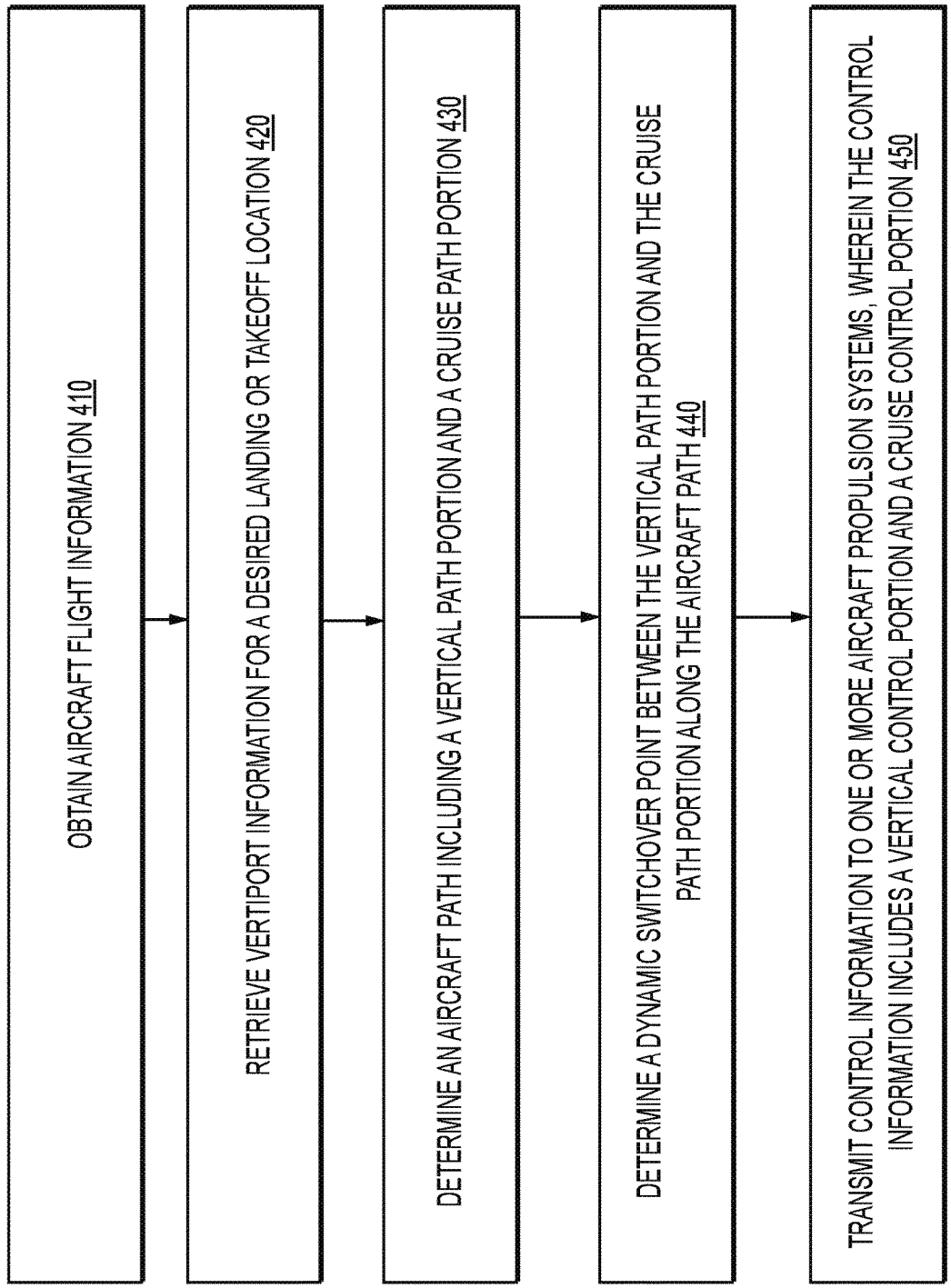
FIG. 4 depicts an exemplary method for transmitting control information to one or more aircraft propulsion systems according to one or more embodiments shown or described herein.

FIG. 4 illustrates an exemplary method 400 for facilitating takeoff and landing of an aircraft in accordance with embodiments of the present disclosure. Beginning at step 410, processor 111 may obtain aircraft information including a current position and a current altitude of the aircraft. At step 420, the system may then retrieve, from a database, vertiport information for a desired landing or takeoff location area including current environmental information and current traffic information. Based on the aircraft information and vertiport information, at step 430, processor 111 can determine an aircraft path including a vertical path portion and a cruise path portion. Based on the aircraft path, at step 440, processor 111 may determine, a dynamic switchover point between the vertical path portion and the cruise path portion along the aircraft path. Once the aircraft path and dynamic switchover point have been determined, processor 111 may, at step 450, transmit control information to one or more aircraft propulsion systems, wherein the control information includes a vertical control portion and a cruise control portion.

Figure 5:
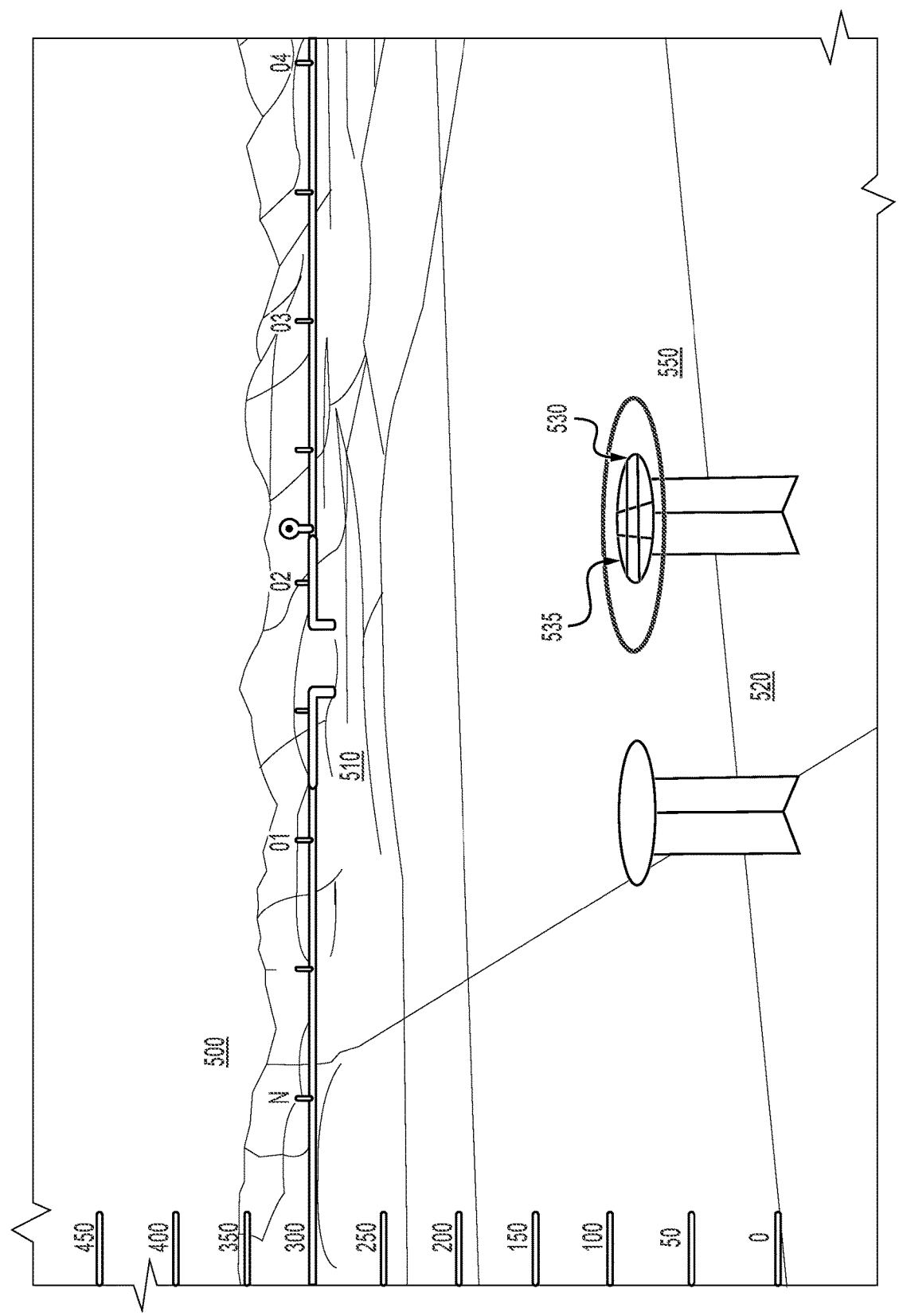
FIG. 5 depicts another virtual representation of an air space using a graphical user interface including a vertiport target.

In some embodiments, as illustrated in FIG. 5, display/UI 114 may display first person display GUI 500. GUI 500 can depict buildings/structures 520, which may include, for example, a destination vertiport 530 from a first-person ("ego") vantage of the aircraft. In some embodiments, the graphical representation of the vertiport 530 may include, for example, an alignment grid 535 for aligning the aircraft (represented by aircraft symbol 510). In some embodiments, processor 111 associated with GUI 500 may generate and display a cruise path, one or more waypoints, a heading, and one or more other graphical features for navigating the aircraft. In some embodiments, the processor 111 associated with GUI 500 may generate and display a dynamic switchover point 550 in such a way that the operators and/or passengers of the aircraft can view the points at which operation of aircraft propulsion systems 118 may change.

Figure 6:
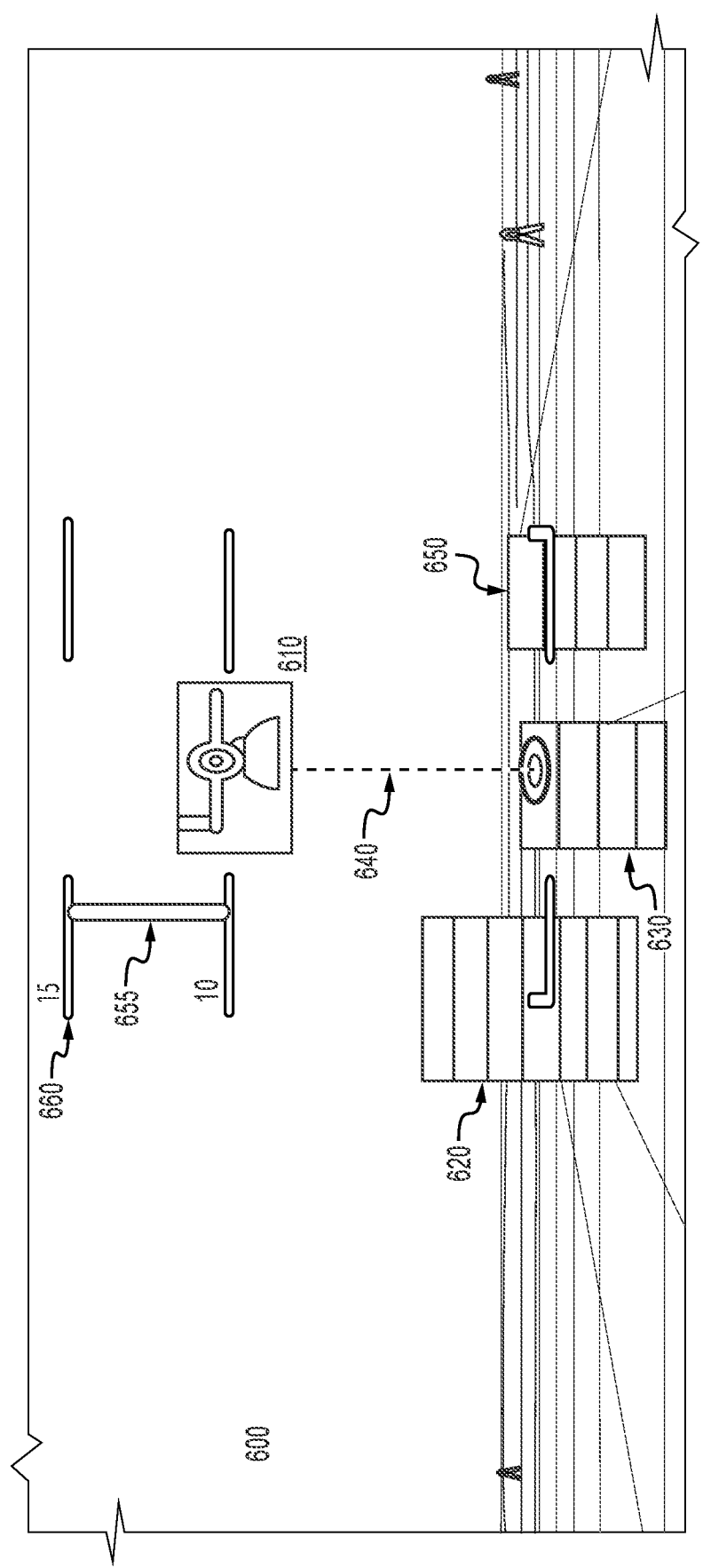
FIG. 6 depicts an exemplary externally oriented graphical user interface.

As illustrated in FIG. 6, once the aircraft begins the vertical descent to landing or as it takes off, display/UI 114 may display a GUI 600, which may be a representation of an aircraft 610 from a third person point of view (an "exo" view). GUI 600 may include the aircraft 610, buildings/structures 620, the destination vertiport 630, the vertical portion 640 of the aircraft path, and a predicted landing spot 650 as viewed from a position in the vicinity of vertiport 630, but external to the aircraft itself. Such a display may allow the operators and/or passengers of the aircraft to have a better sense of the progress of aircraft 610 along vertical path portion 640, as well as the location of predicted landing spot 650 as predicted by the systems aboard the aircraft 610, which may be difficult for forward facing operators/passengers whose viewpoint may be generally forward-centric (i.e., in the forward direction of the aircraft). In some embodiments, the GUI 600 may include a vertical speed error tape 655. The vertical speed error tape 655 may be displayed on an altitude tape (e.g., radio altitude) which vertical speed error tape may be dynamic based on one the position (e.g., vertical position) and/or vectors (e.g., vertical velocity) of the aircraft 610. That is, the vertical speed error tape 655 may move vertically up or down based on the deviation from the expected altitude and/or velocity. The vertical speed error tape 655 may have other dynamic characteristics. For example, it may change colors (e.g., change yellow or amber if there is a relatively slight deviation from the expected velocity change rate and may change, for example, red when velocity is changing faster than a limit velocity). In some embodiments, the icon used to represent the aircraft 610 may take different graphical representations. For example, the aircraft 610 may be represented as an anvil as shown in FIG. 6 to indicate to the pilot(s)/operator(s) of the aircraft 610 that the aircraft is overweight. In such a case, it may indicate a reason to the pilot(s)/operator(s) that the aircraft as to why the aircraft may lift more slowly or land more rapidly than under normal weight conditions.

Figure 7:
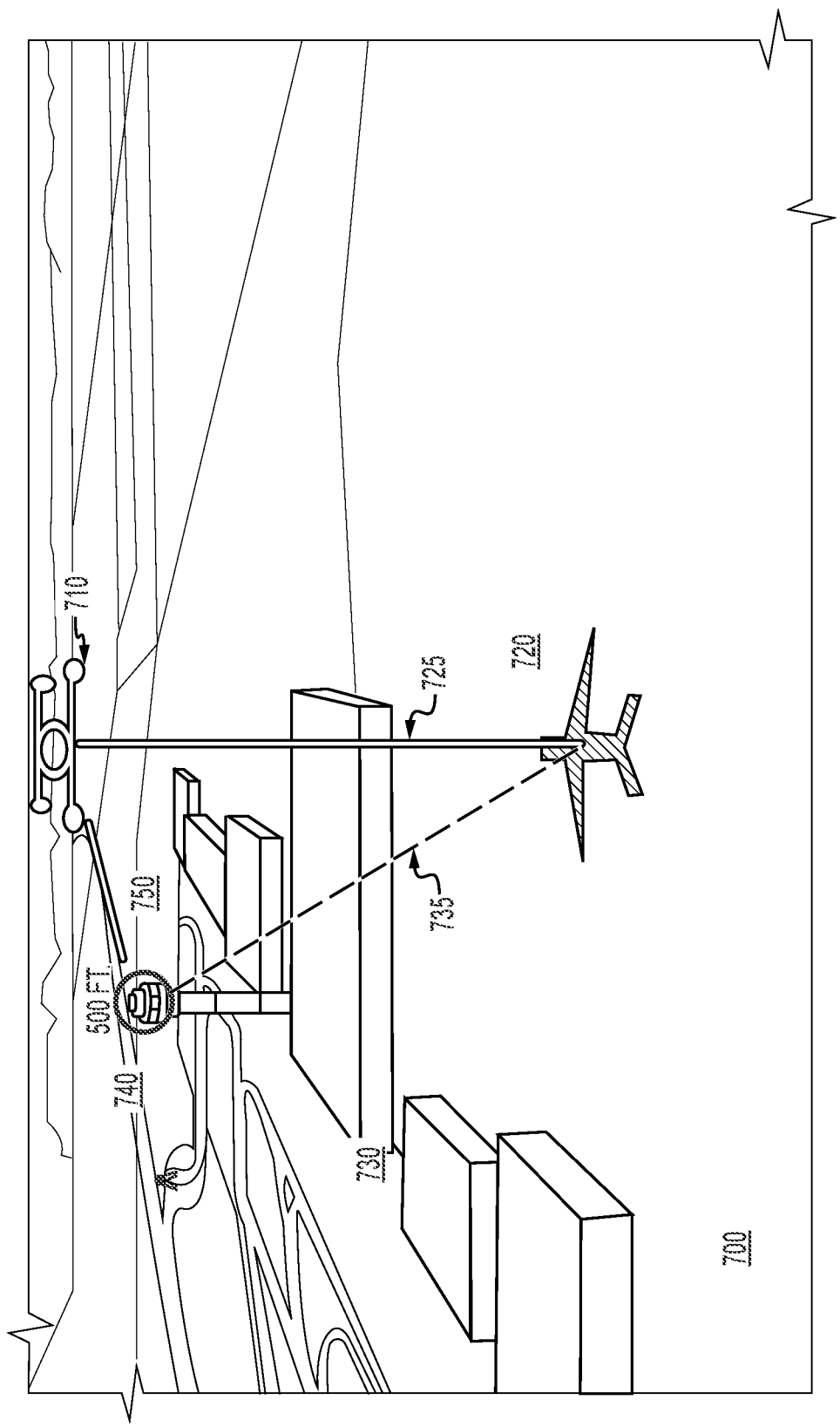
FIG. 7 depicts another exemplary externally oriented graphical user interface including a vertiport target.

As illustrated in FIG. 7, in some embodiments, a VTOL-Exo (or "third person") display mode may be transitioned to once an aircraft is within a transition distance of a vertiport. On the GUI 700 shown in FIG. 7, the aircraft is displayed as aircraft 710 and the aircraft 710 is in the transition distance of a vertiport (i.e., the aircraft is operating under both horizontal and vertical propulsion as it slows to land vertically at the vertiport). A user of the display (e.g., pilot(s)/operator(s)) can see a horizontal location of the aircraft with respect to one or more buildings, structures, and other objects in the external environment 730 based on the position of a shadow 720 of the aircraft 710 in addition to the location of the aircraft 710 itself. In some embodiments, the shadow 720 may be tethered to the aircraft 710 by a tether 725 and the tether 725 may include a numerical representation of an altitude of the aircraft 710 (which may be based on, for example, a reading from a radio altimeter). In some embodiments, a size of the shadow 720 may be dynamic to indicate an altitude of the aircraft 710. For example, the shadow 720 may grow or shrink as the aircraft moves vertically down or up, respectively. In some embodiments, a flight path 750 may show a recommended course to a vertiport 740. The recommended course may be based on, for example, avoiding one or more obstacles (e.g., the buildings, structures, and other objects in the external environment 730, etc.), conserving fuel, arriving in a minimum time, arriving at a specific time, a line-of-sight, or other basis. In some embodiments, the flight path 750 (which may be, for example, a recommended course) may include a ground leg 735 displayed on the display, which may indicate to the pilot(s)/operator(s) the course-over-ground of the aircraft 710.

In the VTOL-Exo mode, the POV position may be at the same height as the aircraft but with the POV shifted behind the aircraft. During the transition to the descent (or after the aircraft has ascended to an appropriate altitude for transitioning to a cruising mode after takeoff), when the aircraft approaches a transitional location (e.g., a transitional altitude and a transitional ground position (e.g., latitude and longitude)), the view mode may transition smoothly from a first-person mode (or "Ego mode") to a third-person mode (or "VTOL-Exo mode") over a given period of time or based on a distance to the vertiport (e.g., altitude, ground distance, etc.) Although an Exo mode is preferred during vertical takeoff and landing, the relative altitude of terrain, obstacles, traffic, waypoints with respect to the subject vehicle can be incorrect in reference to the ZPRL. Hence VTOLExo mode is needed where camera position is at the same altitude of ownship hence ZPRL represents that.

Figure 8:
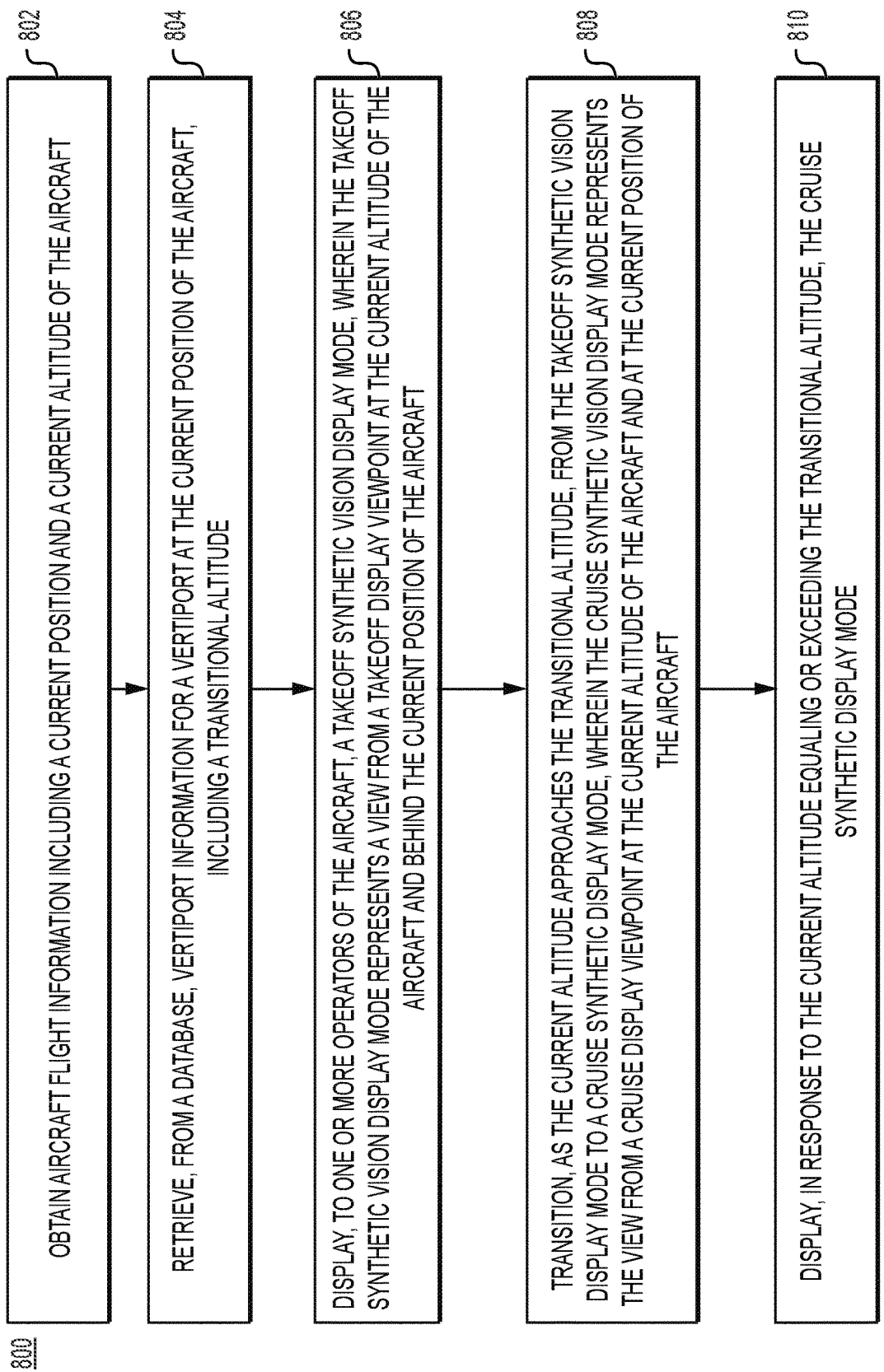
FIG. 8 depicts a method of displaying a cruise synthetic display mode according to one or more embodiments described herein.

FIG. 8 describes a method for transitioning from a third-person display mode (or a "takeoff synthetic vision display mode") to a first-person display mode (or a "cruise synthetic display mode"). By smoothly transitioning from the third-person display mode (generally associated with vertical flight) to the first-person display mode (generally associated with horizontal flight), the view seamlessly transitions from what is generally considered the most useful display mode for an operator in a vertical flight mode to what is generally considered the most useful display mode for an operator in the horizontal flight mode. At step 802, aircraft flight information including a current position and a current altitude of the aircraft may be obtained. The aircraft flight information may be obtained, for example, using the processor 111, which may be communicatively coupled with the network 120. Once the aircraft flight information is obtained, vertiport information may be retrieved from a database for a vertiport at the current position of the aircraft at step 804. The vertiport information may include, for example, a transitional altitude, At step 806, the processor 111 may cause a takeoff synthetic vision display mode (e.g., the "exo" or third-person mode) to be displayed to one or more operators of the aircraft. The takeoff synthetic vision display mode may represent a view from a takeoff display viewpoint at the current altitude of the aircraft and behind the current position of the aircraft (e.g., as shown in FIG. 7). At step 808, the processor may cause the visual display to transition from the takeoff synthetic vision display mode (i.e., the third-person mode) to the cruise synthetic vision display mode as the current position (which may include one or more of a current altitude and/or a current GPS location (e.g., latitude and longitude)) approaches the transitional position at the current altitude of the aircraft and at the current position of the aircraft.

At step 810, the processor 111 may cause the cruise synthetic display mode to be displayed in response to the current position being equal to the transition position (i.e., at the switchover position) or being further from the location of the transition position (i.e., outside the switchover position) from the vertiport. That is, once the aircraft has flown far enough away from the vertiport in the third-person view and has ceased to operate in only a vertical flight mode and has ceased to operate in a combined vertical and horizontal flight mode, and is thus operating in only a horizontal flight mode, the processor 111 may cause the display to display aircraft operations thereon in a third-person view.

Figure 9:
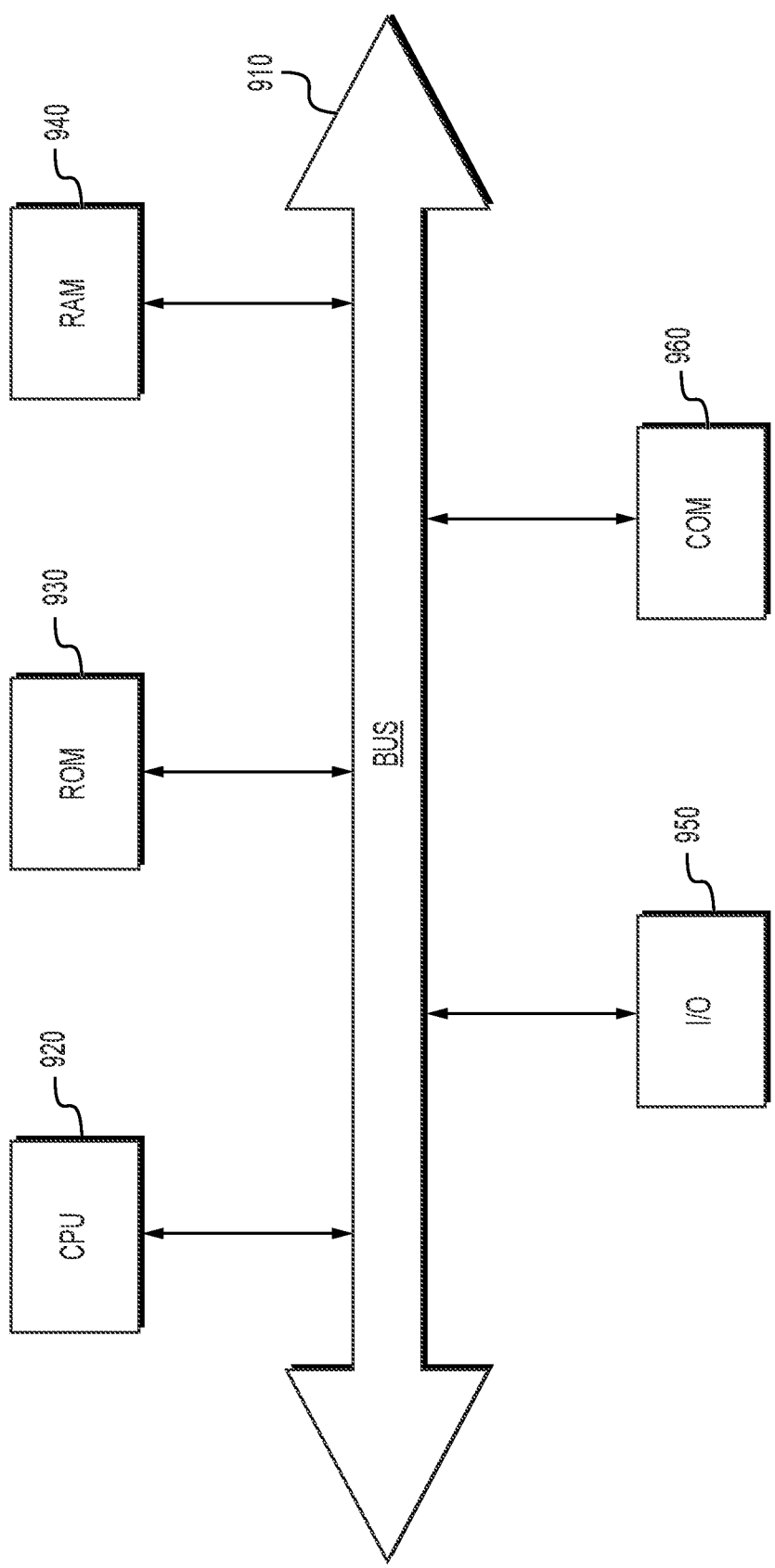
FIG. 9 depicts an exemplary computing environment for carrying out one or more of the methods or embodiments described herein.

FIG. 9 is a simplified functional block diagram of a computing system 900 that may be configured for carrying out one or more of the steps, programs, and/or executing techniques described herein, according to exemplary embodiments of the present disclosure. Specifically, in one embodiment, any of the modules of controller 900 or the controller 900 itself may be an assembly of software and/or hardware including, for example, a data communication interface 960 for packet data communication. The platform may also include a central processing unit ("CPU") 920, in the form of one or more processors, for executing program instructions. The platform may include an internal communication bus 910, program storage, and data storage for various data files to be processed and/or communicated by the platform such as ROM 930 and RAM 940, although the system 900 may receive programming and data via network communications. The system 900 also may include input and output ports 950 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the assessment of models monitoring devices. FIG. 9 and the following discussion provide a brief, general description of a suitable computing environment in which certain embodiments and aspects thereof the present disclosure may be implemented. In one embodiment, any of the disclosed systems, methods, and/or graphical user interfaces may be executed by or implemented by a computing system consistent with or similar to that depicted in FIG. 9. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Systems and methods for facilitating takeoff and landing of an aircraft in accordance with the present disclosure may be able to determine an appropriate path and dynamic switchover point to control one or more propulsion systems of an aircraft and to provide an aircraft operator with an appropriate view of the aircraft as it traverses an airspace. Automatic and dynamic determination of the switchover point for the aircraft may reduce or eliminate the need for an aircraft operator to manually calculate the control inputs needed to transition the aircraft from the cruise portion of the flight path to the vertical portion of the flight path. This in turn may allow the switchover point and transition to be a function of more and more current factors, such as traffic, weather conditions, buildings and structures in the vicinity of the vertiport, and other relevant factors.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A method of providing contextual display modes for a vertical takeoff and landing (VTOL) vehicle comprising:
    obtaining aircraft flight information including a current position and a current altitude of an aircraft;
    retrieving, from a database, vertiport information for a vertiport at the current position of the aircraft, including a transitional altitude;
    displaying, to one or more operators of the aircraft, a takeoff synthetic vision display mode, wherein the takeoff synthetic vision display mode represents a view from a takeoff display viewpoint at the current altitude of the aircraft and behind the current position of the aircraft;
    transitioning, as the current altitude approaches the transitional altitude, from the takeoff synthetic vision display mode to a cruise synthetic vision display mode, wherein the cruise synthetic vision display mode represents the view from a cruise display viewpoint at the current altitude of the aircraft and at the current position of the aircraft; and
    displaying, in response to the current altitude equaling or exceeding the transitional altitude, the cruise synthetic vision display mode.

2. The method of claim 1, wherein the takeoff synthetic vision display mode includes a radio altitude tape including a current radio altitude indicator to indicate the current altitude of the aircraft above the ground.

3. The method of claim 2, wherein the takeoff synthetic vision display mode further includes a vertical speed error tape between the current radio altitude indicator and a planned altitude.

4. The method of claim 3, wherein the vertical speed error tape changes color based on a length of the vertical speed error tape to indicate a warning to a user.

5. The method of claim 3, wherein a flight controller of the aircraft is configured to modify an operation of one or more propulsion systems in response to the vertical speed error tape exceeding a certain size.

6. The method of claim 1, wherein the aircraft flight information further includes a current speed of the aircraft and a transition speed of the transition from the takeoff synthetic vision display mode to a cruise synthetic display mode is correlated with the current speed of the aircraft.

7. The method of claim 1, wherein the transition from the takeoff synthetic vision display mode to a cruise synthetic display mode occurs at a rate that is correlated with the current altitude of the aircraft.

8. The method of claim 1, further including:
- transitioning, as the aircraft approaches a landing vertiport, from the cruise synthetic vision display mode to a landing synthetic vision display mode, wherein the landing synthetic vision display mode represents the view from a landing display viewpoint at the current altitude of the aircraft and behind the current position of the aircraft; and
- displaying, in response to the aircraft being in vertical alignment with the landing vertiport, the landing synthetic vision display mode.

9. The method of claim 8, wherein the cruise synthetic vision display mode includes a landing transition target at a landing transitional altitude above the landing vertiport.

10. The method of claim 9, wherein the cruise synthetic vision display mode further includes a landing tether line extending from the landing transition target to the landing vertiport.

11. A system comprising:
- at least one display associated with an aircraft;
- a memory storing instructions; and
- a processor executing the instructions to perform a process for providing contextual display modes for a vertical takeoff and landing vehicle (VTOL) including:
  - obtaining aircraft flight information including a current position and a current altitude of the aircraft;
  - retrieving, from a database, vertiport information for a vertiport at the current position of the aircraft, including a transitional altitude;
  - displaying, to one or more operators of the aircraft on the at least one display, a takeoff synthetic vision display mode, wherein the takeoff synthetic vision display mode represents a view from a takeoff display viewpoint at the current altitude of the aircraft and behind the current position of the aircraft;
  - transitioning, as the current altitude approaches the transitional altitude, from the takeoff synthetic vision display mode to a cruise synthetic vision display mode, wherein the cruise synthetic vision display mode represents the view from a cruise display viewpoint at the current altitude of the aircraft and at the current position of the aircraft; and
  - displaying, in response to the current altitude equaling or exceeding the transitional altitude, the cruise synthetic vision display mode.

12. The system of claim 11, wherein the takeoff synthetic vision display mode includes a radio altitude tape including a current radio altitude indicator to indicate the current altitude of the aircraft.

13. The system of claim 12, wherein the takeoff synthetic vision display mode further includes a vertical speed error tape between the current radio altitude indicator and a planned altitude.

14. The system of claim 13, wherein the vertical speed error tape changes color based on a rate at which it is lengthening or contracting.

15. The system of claim 13, wherein a flight controller of the aircraft is configured to modify an operation of one or more propulsion systems in response to the vertical speed error tape exceeding a certain size.

16. The system of claim 11, wherein the aircraft flight information further includes a current speed of the aircraft and a transition speed of the transition from the takeoff synthetic vision display mode to a cruise synthetic display mode is correlated with the current speed of the aircraft.

17. The system of claim 11, wherein the transition from the takeoff synthetic vision display mode to a cruise synthetic display mode occurs at a rate that is correlated with the current altitude of the aircraft.

18. The system of claim 11, the process further including:
- transitioning, as the aircraft approaches a landing vertiport, from the cruise synthetic vision display mode to a landing synthetic vision display mode, wherein the landing synthetic vision display mode represents the view from a landing display viewpoint at the current altitude of the aircraft and behind the current position of the aircraft; and
- displaying, in response to the aircraft being in vertical alignment with the landing vertiport, the landing synthetic vision display mode.

19. The system of claim 18, wherein the cruise synthetic vision display mode includes a landing transition target at a landing transitional altitude above the landing vertiport and a landing tether line extending from the landing transition target to the landing vertiport.

20. A method of providing contextual display modes for a vertical takeoff and landing (VTOL) aircraft comprising:
- obtaining aircraft flight information including a current position and a current altitude of the aircraft;
- retrieving, from a database, vertiport information for a vertiport at the current position of the aircraft, including a transitional altitude;
- displaying, to one or more operators of the aircraft, a takeoff synthetic vision display mode, wherein the takeoff synthetic vision display mode represents a view from a takeoff display viewpoint at the current altitude of the aircraft and behind the current position of the aircraft;
- transitioning, as the current altitude approaches the transitional altitude, from the takeoff synthetic vision display mode to a cruise synthetic vision display mode, wherein the cruise synthetic vision display mode represents the view from a cruise display viewpoint at the current altitude of the aircraft and at the current position of the aircraft;
- displaying, in response to the current altitude equaling or exceeding the transitional altitude, the cruise synthetic vision display mode;
- transitioning, as the aircraft approaches a landing vertiport, from the cruise synthetic vision display mode to a landing synthetic vision display mode, wherein the landing synthetic vision display mode represents the view from a landing display viewpoint at the current altitude of the aircraft and behind the current position of the aircraft; and
- displaying, in response to the aircraft being in vertical alignment with the landing vertiport, the landing synthetic vision display mode,
- wherein transitioning between the takeoff synthetic vision display mode and the cruise synthetic vision display mode occurs at a rate that is correlated with at least one of a current speed of the aircraft or the current altitude of the aircraft.

* * * * *